United States Patent [19]

Rohani et al.

[11] Patent Number: 5,390,166
[45] Date of Patent: Feb. 14, 1995

[54] METHOD FOR RECOVERING A DATA SIGNAL USING DIVERSITY IN A RADIO FREQUENCY, TIME DIVISION MULTIPLE ACCESS COMMUNICATION SYSTEM

[75] Inventors: Kamyar Rohani, Vista, Calif.; John D. Reed, Arlington, Tex.

[73] Assignee: Motorola, Inc., Schaumburg, Ill.

[21] Appl. No.: 91,846

[22] Filed: Jul. 14, 1993

[51] Int. Cl.⁶ .................. H04J 13/00; H04B 15/00; H04L 27/30
[52] U.S. Cl. ...................... 370/18; 370/95.3; 375/1; 375/40; 455/133; 455/137
[58] Field of Search ............. 370/18, 95.1, 95.3; 375/1, 38, 100, 40, 96; 379/59, 60; 455/33.1, 33.2, 33.4, 133, 137

[56] References Cited

U.S. PATENT DOCUMENTS

| | | |
|---|---|---|
| 4,616,364 | 10/1986 | Lee .................................. 375/40 |
| 4,765,753 | 8/1988 | Schmidt ............................ 370/18 |
| 5,031,193 | 7/1991 | Atkinson et al. .................. 375/13 |
| 5,101,501 | 3/1992 | Gilhousen et al. ................ 370/18 |
| 5,109,390 | 4/1992 | Gilhousen et al. ................ 370/18 |

Primary Examiner—Douglas W. Olms
Assistant Examiner—Hassan Kizou
Attorney, Agent, or Firm—Raymond J. Warren

[57] ABSTRACT

In a time division multiple access (TDMA) system (10), a method (50, 60) of recovering a data signal of a transmission burst commences by obtaining the frequency transmission codes for the transmitters to be monitored (52, 62). The data signal is then received in separate transmission bursts from a first transmitter in a first time period (53, 65) and from a second transmitter in a second time period (56, 65). The data signal of one of the received transmission bursts is then selected or a plurality of the data signals are combined (58, 69) to be used by the receiver as the received data signal.

19 Claims, 3 Drawing Sheets

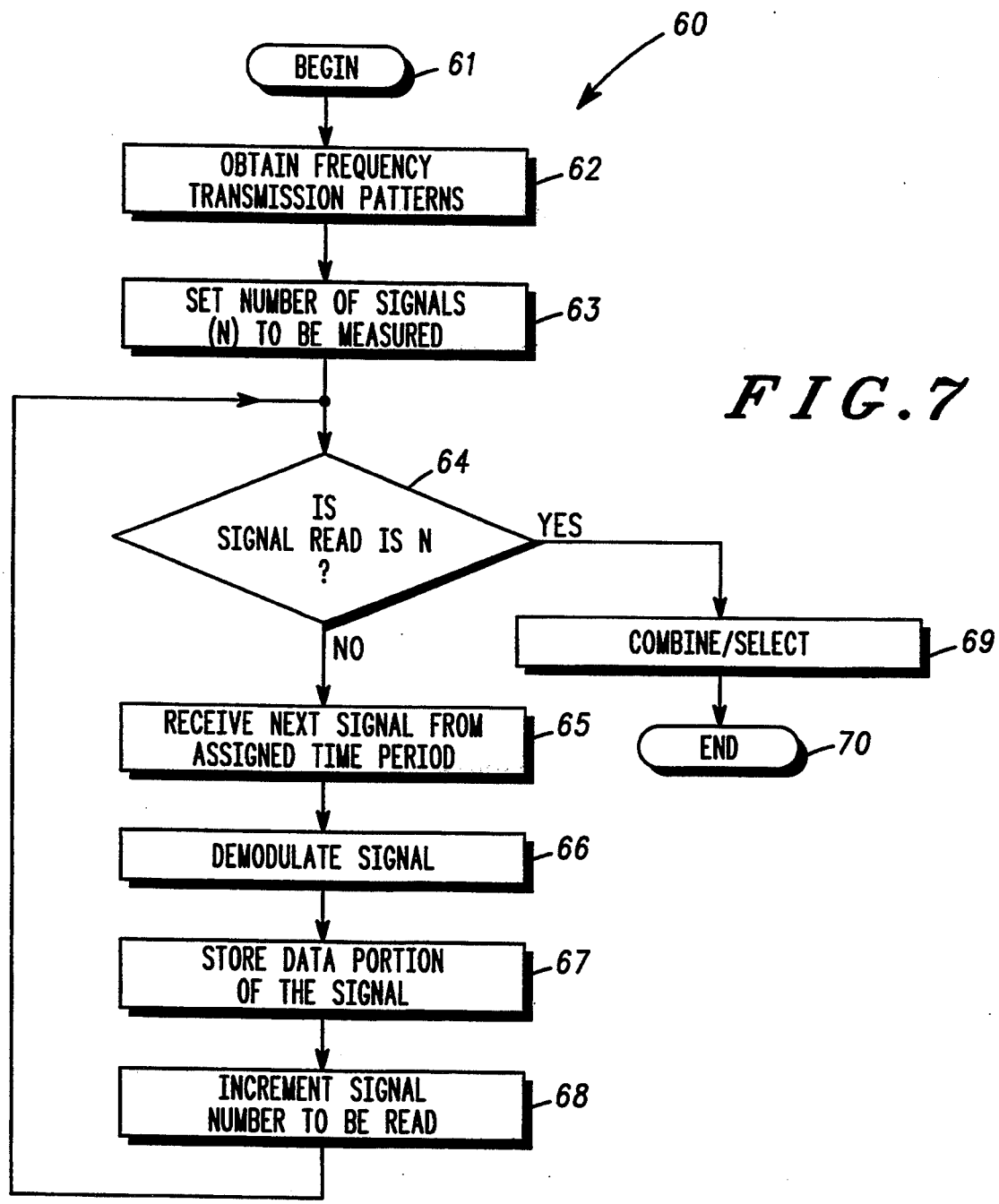

METHOD FOR RECOVERING A DATA SIGNAL USING DIVERSITY IN A RADIO FREQUENCY, TIME DIVISION MULTIPLE ACCESS COMMUNICATION SYSTEM

FIELD OF THE INVENTION

The present invention relates, in general, to communication systems and, more particularly, to a method for recovering a data signal using diversity in a radio frequency (RF) time division multiple access (TDMA) communication system.

BACKGROUND OF THE INVENTION

The problem being addressed in the present case is that of providing improved reception by a subscriber who has entered an area between two or more transmission cells of a cellular communication system. Often in this type of situation, the transmission burst from the serving transmitter will have degraded to a point where the reception is considered poor. The surrounding cells are unable to provide any better service and, therefore, no hand-off is performed.

One possible alternative to this problem is the use of simulcast. Using simulcast, a plurality of transmitters all transmit the same burst at the same time. The cumulative effect of these bursts at the receiver will improve the quality of the call. However, this requires that all of the plurality of transmitters broadcast on the same frequency at the same time, which defeats the idea of cellular coverage. In addition, since the signals from the various transmitters will in all probability reach the receiver at slightly different times, the received signal quality may in fact be worse, due to the varying delay times, than with a single transmitter.

SUMMARY OF THE INVENTION

In the present invention, a method for recovering a data signal using diversity in a radio frequency (RF) time division multiple access (TDMA) communication system is provided. The subscriber first obtains the frequency transmission patterns of the transmitters to be monitored. The data signal is then recovered from a first transmission burst received from a first transmitter in a first time period and from a second transmission burst received from a second transmitter in a second time period. The two data signals are then either combined or the best data signal of the two is selected for processing.

BRIEF DESCRIPTION OF THE DRAWINGS

FIG. 7 is a flow chart of a method illustrating a general embodiment of the present invention.

DETAILED DESCRIPTION OF THE DRAWINGS

Figure 1:
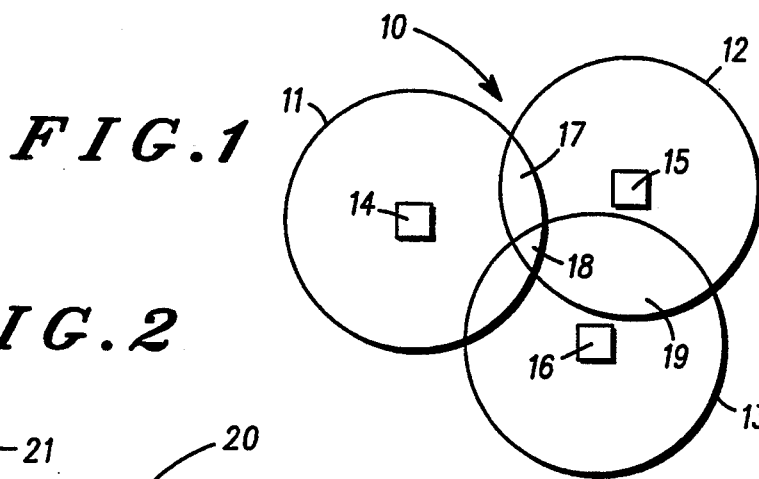
FIG. 1 is diagram of a portion of a cellular communication system.

Referring initially to FIG. 1, a portion of a cellular communication system, generally designated 10, is illustrated. System 10 is a frequency hopping TDMA system which is also known as a frequency hopped, code division multiple access (FH-CDMA) system; and consists of three cells 11–13. Each cell 11–13 has a transmitter 14–16, respectively, and each of transmitter 14–16 transmits using a different code or frequency transmission pattern.

A subscriber (17–19) may be located anywhere within system 10. As is known in the art, the closer the subscriber (17–19) is to a transmitter (14–16), the stronger the received transmission burst will be, assuming a fixed transmission power level. Even in an ideal system, as the subscriber moves away from the transmitter, the received burst will gradually degrade, again assuming fixed power. In practical applications, many other environmental factors will cause the burst to degrade further (e.g. noise from other users or shadowing—attenuation—due to obstacles such as buildings, mountains, etc.).

As a subscriber, during a call, moves away from one transmitter toward another, the subscriber's call will be transferred from a first serving site to a second. This is typically referred to as hand-off and can be performed using a myriad of techniques. However, there still remains a problem in areas between sites (or transmitter antenna's), such as the locations of subscribers 17–19. In these areas, the transmission burst from the original transmitter, 14 for example, may have become weak; but, the burst is still stronger than that received by the subscriber from antenna 15. Therefore, no hand-off is performed and the subscriber is forced to operate at a degraded level.

Another problem, which is more pronounced in this situation, is that bursts received from either transmitters 14 or 15 may be adequate at one particular instant; but, due to fading, they will provide only intermittent service. The result is that the subscriber would keep switching form one transmitter to the other. This problem is known in the industry as ping-ponging. In systems that are designed to prevent this ping-ponging the signal will continually fade in and out.

Figure 2:
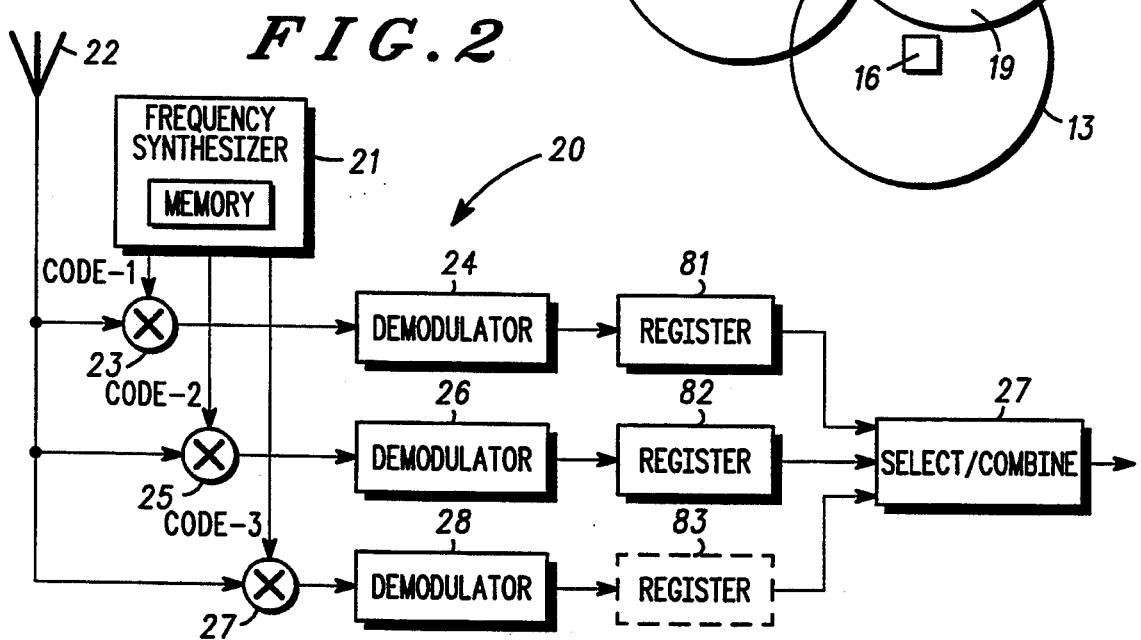
FIG. 2 is a block diagram of a portion of a subscriber unit embodying the present invention.

A solution to these problems is provided by the subscriber unit diagram, generally designated 20, illustrated in FIG. 2. In a FH-CDMA system, the burst is transmitted and received in time slots of a frame. The frequency in which the frame is transmitted/received will change with each frame according to a preset code pattern. When a communication link is established the codes are transferred between the serving site and subscriber unit such that each unit may recover the transmitted burst. For the subscriber unit, this code is stored in a memory and used to modulate a frequency synthesizer 21. The transmission burst, when received by antenna 22, is despread with the frequency pattern represented by Code-1 in mixer 23 to down convert the received burst to the appropriate frequency. The recovered burst is then demodulated in demodulator 24.

However, as described above, there are times when the transmission burst from one transmitter is weak enough to result in degraded service and the standard hand-off solution is not available. In the present invention, subscriber 20 has the capability of monitoring multiple transmitters. By way of example, a subscriber at location 17 can monitor transmission bursts from both transmitters 14 and 15. When this situation arises, both transmitters 14 and 15 will transmit the same data signal using different transmission bursts transmitted at different frequencies and different time slots.

Figure 5:
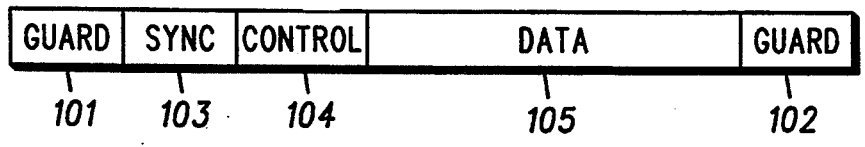
FIG. 5 is a block diagram representing a time slot containing a transmission burst of a channel frame.

An example of a transmission burst, generally designated 100, contained in a time slot is illustrated in FIG. 5. While the configuration may change depending upon the standard implemented (e.g. the Group Special Mobile standard, GSM, used in Europe; Japan Digital Cellular, JDC, also known as Personal Digital Cellular, PDC, from Japan; and United States Digital Cellular, USDC, from the United States) the slot structure has four basic components. First, there is, generally, some form of guard band represented by guard blocks 101 and 102. These guard bands are provided to separate adjacent time slot signals. Next, there is a synchronization signal represented by SYNC block 103. This is used by the receiver to synchronize to the transmission timing and may also be used for processes such as equalization. The time slots will typically also contain a control portion, such as block 104. The control section contains information such as power control signals, etc. Finally the data signal, block 105, contains the voice being transmitted. The present invention is primarily involved with attempting to improve the quality of the data signal of the transmission burst received by the subscriber.

Figure 6:
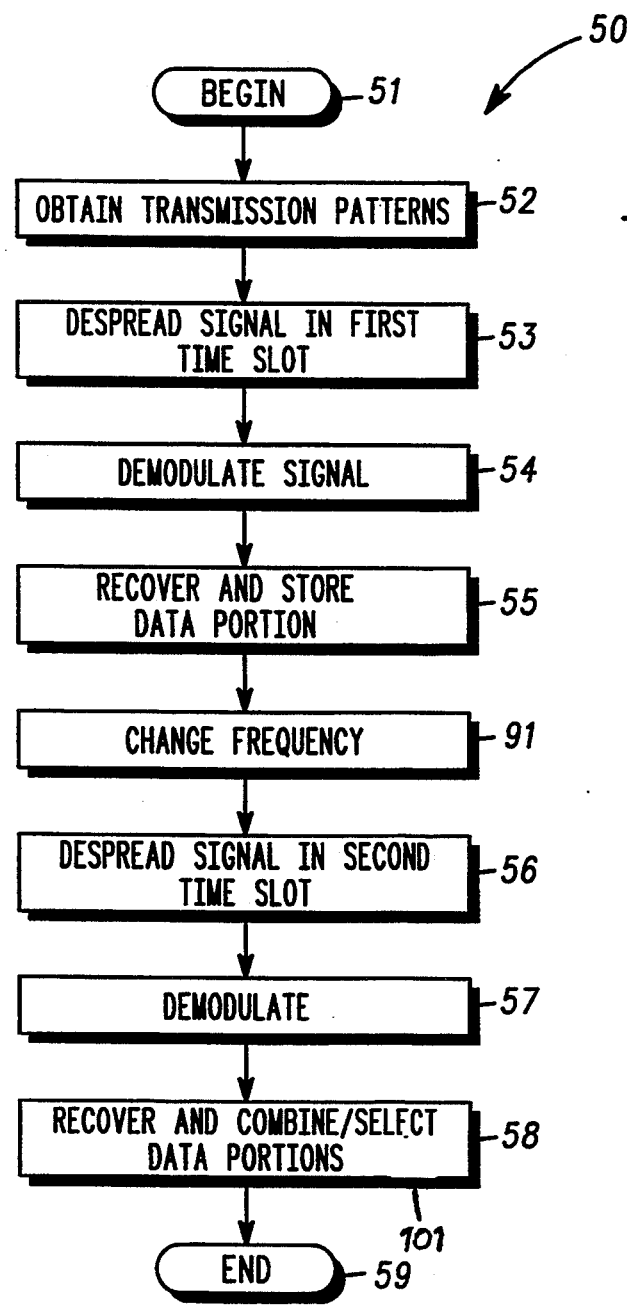
FIG. 6 is a flow chart of a method illustrating one particular embodiment of the present invention.

A process to accomplish this, generally designated 50, illustrating the operation of the present invention is provided in FIG. 6. In operation, beginning at step 51, subscriber 20 will be provided with the frequency hopping codes which will enable it to despread the received bursts, step 52. Code-1 is used in mixer 23 to despread the burst from transmitter 14, step 53, and Code-2 in mixer 25 to despread the burst from transmitter 15, step 56. However, since transmitters 14 and 15 are transmitting at different frequencies, subscriber 20 cannot receive both bursts at the same time. Therefore, the bursts must be spaced in time as provided in TDMA systems.

Figure 4:
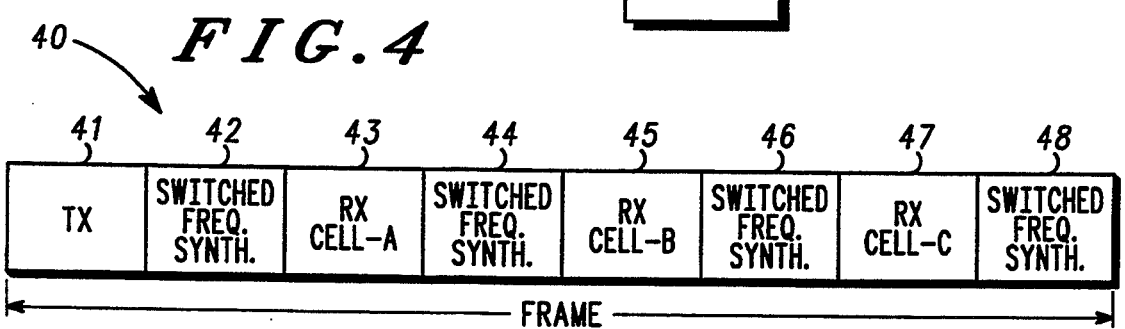
FIG. 4 is a block diagram representing the operation of a subscriber unit of FIGS. 1 or 2 during a channel frame.

Referring to FIG. 4, a frame 40 of a TDMA format, having eight slots, is illustrated. During slot 41, subscriber 20 transmits to a primary site. During slot 42, subscriber 20 will switch frequencies to receive a transmission burst from the same site during slot 43. This transmission burst is the one despread in mixer 23, step 53. The despread burst is then demodulated in a demodulator 24, step 54, and the data signal stored in a register 81, step 55. Register 81 is used to delay the data signal so that it may be appropriately combined/selected at a later time.

Subscriber 20 then switches frequencies, step 91, during slot 44 and receives a transmission burst from the second transmitter during slot 45. This second transmission burst has substantially the same data signal as the burst from the first transceiver. The transmission burst is despread in mixer 25, step 56, and demodulated in demodulator 26, step 57. If subscriber 20 is only listening for two bursts, then the demodulated data signal from demodulator 26 can be combined directly with the data signal stored in register 81 in combiner 27, step 58, and process 50 ends, step 59. If subscriber 20 is monitoring a third signal, then the demodulated second data signal is stored in a register 82. Alternatively, instead of combining the data signals, one of the data signals may be selected for that particular time period. The selected data signal would be the one having the preferred characteristic (e.g. received signal strength, word/bit error rate, etc.).

When a third transmission burst is monitored, subscriber 20 uses slot 46 to switch frequencies to that used by the third transmitter. The burst received from the third transmitter is received in slot 47, despread in mixer 27 using the frequency pattern from Code-3, and demodulated in demodulator 28. The data signal output from demodulator 28 may optionally be stored in register 83 and is combined with the outputs of registers 81 and 82 to provide the received data signal. Again, selection of the better data signal is also possible.

Finally, subscriber 20 uses slot 48 to switch to the frequency being utilized by the original transmitter and repeats the process. It should be understood that the subscriber may not require a full time slot in which to change frequencies (or visa-versa) and may be designed to receive the transmission burst and change frequencies in a single time slot. In this regard, slots 44 and 45 can be portions of the single time slot. Further, the switching slots could be eliminated through the use of a dual synthesizer. A dual synthesizer would allow one synthesizer to switch frequencies while the second synthesizer was locked and active. In the above example, this would permit the measurement of six cell sites in a frame.

A more generic method, generally designated 60, of illustrating the above process is illustrated in FIG. 7. When a situation arises where a transmission burst has degraded, as described above, the subscriber unit begins operation at step 61. This embodiment is illustrated in FIG. 5. The subscriber unit will first access the codes for the stations to be monitored, step 62. These codes may be requested by the subscriber at that time, or have been provided previously by the system. The subscriber must also determine how many and which base stations to monitor, step 63.

Once established, process 60 determines if less than all of the transmitters have been monitored, decision step 64. If less than all of the transmitters have been monitored, process 60 will proceed to step 65 and recover the next transmission burst during that time slot. The burst is then demodulated, step 66, and the data signal stored, step 67, with the step of storing the final data signal being optional.

After storing the data signal, the transmission burst number to be read is incremented, step 68, and process 60 returns to step 64. If all of the transmission bursts have been read, the process proceeds to step 69 where the data signals are combined or a best data signal is selected. The data signal is then provided to the system and process 60 ends, step 70.

Figure 3:
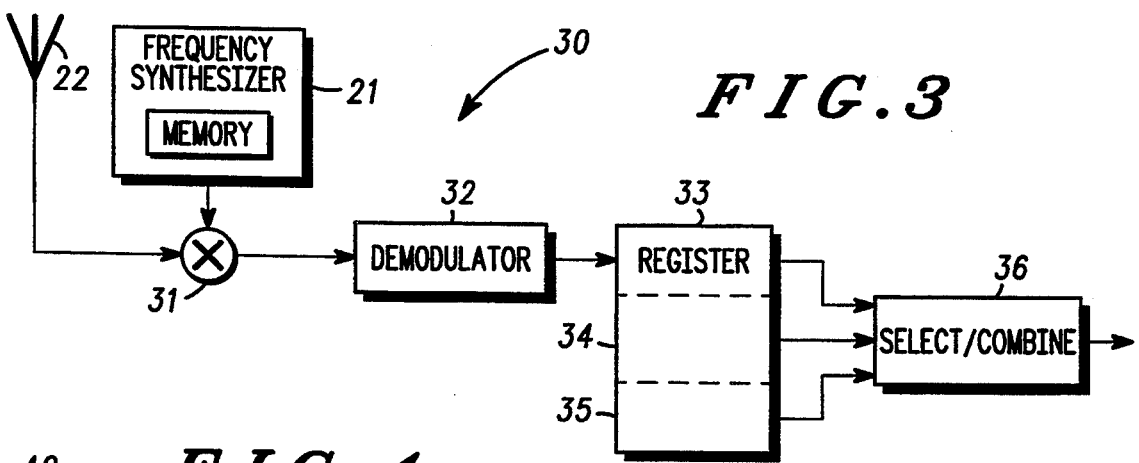
FIG. 3 is a block diagram of a portion of another subscriber unit embodying the present invention.

An alternative embodiment to the present invention is provided in FIG. 3. Here subscriber 30 is designed with a single mixer 31 and a single demodulator 32. In slot 41, subscriber 30 would transmit its transmission burst to a receiver. In slot 42, subscriber 30 would switch to the receive frequency of the first transmitter and would receive the transmission burst in slot 43. This received burst would be provided to mixer 31 and despread using the frequency pattern provided by Code-1. The transmission burst would then be demodulated in demodulator 32 and stored in a register 33.

Subscriber 30 then uses the next slot, slot 44, to switch to the frequency of a second transmitter. In slot 45, the transmission burst from the second transmitter is recovered. The data signal of the transmission burst from the second transmitter is substantially the same data signal as recovered from the transmission burst received during slot 42. This received transmission burst is then despread using the frequency pattern of Code-2 in mixer 31. The burst is demodulated in demodulator 32 and the data signal stored in register 34.

If only two bursts are being monitored, the step of storing the second data signal may be omitted and the second data signal can be combined directly with the data signal stored in register 33 in combiner 36. Alternatively, if data signal selection is being performed, the best data signal will be forwarded for processing.

If a third transmission burst is to be used, then subscriber 30 uses slot 46 to again switch frequencies to a third transmitter and receive a transmission burst in slot 47. The received burst is despread in mixer 31 using the frequency pattern provided by Code-3, and demodulated in demodulator 32. The recovered data signal may optionally be stored in register 35. The three data signals are then either combined or the best one selected to provide the desired data signal.

It should be understood that the data signal being processed in the registers and selection/combiner circuit is the data signal portion of the transmission burst and not typically the guard, ramp, or synchronization portions.

Following the receipt of the last transmission burst, subscriber 30 would then switch to the frequency needed to contact the original site during slot 48.

Thus, it will be apparent to one skilled in the art that there has been provided in accordance with the invention, a method for recovering a data signal using diversity in an RF FH-CDMA communication system which fully satisfies the objects, aims, and advantages set forth above.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

We claim:

1. A method for recovering a data signal using diversity in a RF (Radio Frequency) TDMA (Time Division Multiple Access) communication system, said method comprising the steps of:
    obtaining a frequency transmission pattern for each of a plurality of transmitters;
    using a first frequency transmission pattern of a first transmitter to recover said data signal from a first transmission burst in a first time period;
    using a second frequency transmission pattern of a second transmitter to recover said data signal from a second transmission burst in a second time period, said second time period being subsequent to said first time period; and
    combining said data signal as recovered in said first time period with said data signal as recovered in said second time period.

2. The method of claim 1 wherein said RF TDMA communication system is a frequency hopping code division multiple access (FH-CDMA) system.

3. The method of claim 1 further comprising the step of switching from a frequency of said first transmitter to a frequency of said second transmitter following said first time period.

4. The method of claim 1 further comprising the step of storing said data signal recovered during said first time period.

5. The method of claim 1 further comprising the steps of demodulating said first and second transmission bursts.

6. The method of claim 1 wherein said first and second time periods are each a time slot.

7. The method of claim 1 wherein said first and second time periods are contained within a single time slot.

8. A method for recovering a data signal using diversity in a RF (Radio Frequency) TDMA (Time Division Multiple Access) communication system, said method comprising the steps of:
    obtaining a frequency transmission pattern for each of a plurality of transmitters;
    using a first frequency transmission pattern of a first transmitter to recover said data signal from a first transmission burst in a first time period;
    switching from a frequency of said first transmitter to a frequency of a second transmitter following said first time period;
    using a second frequency transmission pattern of said second transmitter to recover said data signal from a second transmission burst in a second time period; and
    selecting said data signal as recovered in said first time period or said second time period.

9. The method of claim 8 wherein said RF TDMA communication system is a frequency hopping code division multiple access (FH-CDMA) system.

10. The method of claim 8 further comprising the step of storing said data signal of said first transmission burst.

11. The method of claim 8 further comprising the step of demodulating said first and second transmission bursts.

12. The method of claim 8 wherein said first and second time periods are each a time slot.

13. The method of claim 8 wherein said first and second time periods are contained within a single time slot.

14. A method for recovering a data signal using diversity in a RF (Radio Frequency) TDMA (Time Division Multiple Access) communication system, said method comprising the steps of:
    obtaining a frequency transmission code for each of a plurality of transmitters;
    using a first frequency transmission code of a first transmitter to despread a first transmission burst during a first time period;
    recovering said data signal from said first transmission burst;
    switching, according to a second frequency transmission code, to a second frequency during a second time period;
    using said second frequency transmission code of a second transmitter to despread a second transmission burst during a third time period;
    recovering said data signal from said second transmission burst; and
    combining said data signal as recovered from said first transmission burst and said data signal as recovered from said second transmission burst.

15. The method of claim 14 wherein said first and third time periods are each a time slot.

16. The method of claim 14 wherein said second and third time periods are contained within a single time slot.

17. The method of claim 14 wherein said TDMA communication system is a frequency hopping code division multiple access (FH-CDMA) communication system.

18. A method for recovering a data signal using diversity in a RF (Radio Frequency) TDMA (Time Division Multiple Access) communication system, said method comprising the steps of:

(a) obtaining a frequency transmission code for each of a plurality of transmission bursts to be recovered;

(b) receiving one of said plurality of transmission bursts transmitted from one of a plurality of transmitters if fewer than all of said plurality of transmission bursts have been recovered;

(c) demodulating said transmission burst, forming a demodulated transmission burst;

(d) storing said data signal recovered from said demodulated transmission burst if said data signal has been recovered from fewer than all of said plurality of transmission bursts;

(e) repeating steps (a)–(d) until all of said plurality of transmission bursts have been received; and (f) combining the data signals recovered from said demodulated transmission bursts forming a recovered signal.

19. The method of claim 18 wherein said TDMA communication system is a frequency hopping code division multiple access (FH-CDMA) communication system.

* * * * *